United States Patent [19]
Black et al.

[11] Patent Number: 5,195,458
[45] Date of Patent: Mar. 23, 1993

[54] BLOCK FEEDER

[75] Inventors: Garland Black, Fredericksburg, Tex.; Roy W. Sanders, HC 64, Box 492, Harper, Tex. 78631

[73] Assignee: Roy W. Sanders, Harper, Tex.

[21] Appl. No.: 827,409

[22] Filed: Jan. 29, 1992

[51] Int. Cl.$^5$ .............................................. A01K 5/015
[52] U.S. Cl. ................... 119/51.03; 119/52.1
[58] Field of Search ................ 119/51.03, 52.1, 53, 119/51.5

[56]  References Cited

U.S. PATENT DOCUMENTS

| | | | |
|---|---|---|---|
| 332,973 | 12/1885 | Thompson | 119/51.03 |
| 382,048 | 5/1888 | Lindner | 119/51.03 |
| 2,725,852 | 12/1955 | Cramer | 119/51.03 |
| 3,362,382 | 1/1968 | Frasier | 119/60 |
| 3,512,505 | 5/1970 | Cross et al. | 119/51.03 |

FOREIGN PATENT DOCUMENTS 2462860  2/1981  France ..................... 119/51.03

*Primary Examiner*—John G. Weiss

[57]  ABSTRACT

A block feeder for feeding animals such as cattle, sheep, goats, deer, and the like is provided. The block feeder comprises a feed bin, support bar, and leg structure. The feed bin has an open bottom and the feed blocks are supported by the support bar so that a portion of the bottom feed blocks are exposed to the animals. The feed bin keeps the feed blocks dry, which minimizes spoilage and allows the block feeder to be restocked less frequently. As the animals consume the feed blocks, the feed blocks slide downward, exposing more of the feed block to the animals. The block feeder also may include a tray located beneath the feed block so that waste of scrap feed falling from the feed block is minimized.

13 Claims, 1 Drawing Sheet

BLOCK FEEDER

TECHNICAL FIELD

This invention relates to block feeders for feeding animals and more particularly to block feeders for cattle, sheep, goats, deer, and the like.

BACKGROUND OF THE INVENTION

If animal feed gets wet, it tends to spoil more quickly and may go to waste. Block feeders are intended to protect the feed supply so that a rancher, for example, may restock the animal feed supply less frequently. The animals should be able to eat from the block feeder while the feeder keeps the feed dry.

The typical block feeder fails to adequately protect the block feed from rain and other precipitation, for example, by allowing water to collect the bottom of the feeder and soak into the block feed. Therefore, the object of the invention is to provide an improved block feeder that overcomes the shortcomings of other block feeders.

SUMMARY OF THE INVENTION

The block feeder of the invention provides an apparatus and method of feeding cattle, sheep, goats, deer, and the like. The block feeder is ideal for feeding stock animals and deer so that feed can be distributed to the feeding locations less frequently. The block feeder keeps the feed blocks substantially dry so as to minimize spoilage of the feed before it can be consumed.

The block feeder includes a feed bin, a support bar or other means for supporting the lower portion of a feed block, and a support structure to position the feed bin above the ground. A more preferred embodiment includes a tray positioned beneath the feed bin to catch any feed grain that falls from feed blocks so the animals may eat the scraps from the tray. Another feature of the preferred embodiment is that the height of the feed bin, the support bar, and the tray are adjustable to accommodate different animals.

The feed bin generally has side walls and top wall and is of a size and shape to at least partially accommodate at least one feed block within the feed bin. Preferably the feed bin can accommodate at least two stacked feed blocks and all but the lower portion of the bottom feed block is within the feed bin. Thereby the bin substantially protects the feed blocks from precipitation such as rain and sleet. The feed bin can be designed to accommodate several stacks of feed blocks. The size of the feed bin depends in part on the needs of the animals and how frequently the rancher prefers to restock the block feeder.

The support bar or other means for supporting the feed blocks is designed so that a portion of the bottom feed block extends below the side walls of the feed bin. Preferably the support bar is narrow where it contacts the bottom of the feed blocks. Animals may reach and eat at the lower extending portion of the feed block. As the lower portion of the feed block is consumed by the animals, the feed blocks slide downward to expose more of the feed block. Preferably the support bar is located toward the center of the bottom surface of the lowermost feed block in the stack.

The support structure for supporting the feed bin and the support bar may comprise any number of leg or strut constructions. The support structure should not interfere with the approach of the animals to the block feeder or the access of the animals to the portion of the feed blocks extending below the feed bin. Preferably the feed bin and the support bar are adjustable so that the heights are most suitable for the particular animals.

BRIEF DESCRIPTION OF THE DRAWINGS

The features and advantages of the invention will become more readily apparent from the following figures, wherein like reference numerals refer to like parts throughout the figures.

DETAILED DESCRIPTION OF A PREFERRED EMBODIMENT

Figure 1:
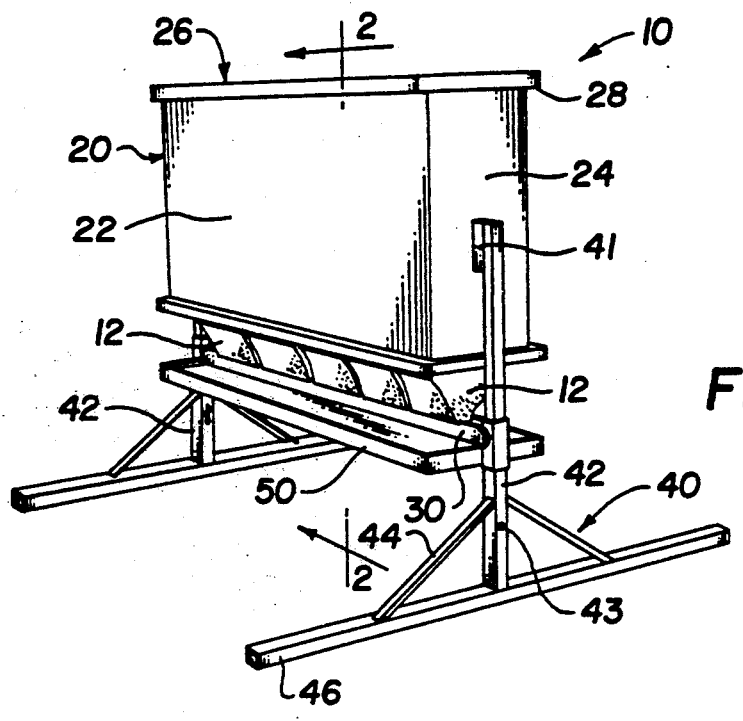
FIG. 1 is a perspective view of a preferred embodiment of the block feeder of the invention.
Figure 2:
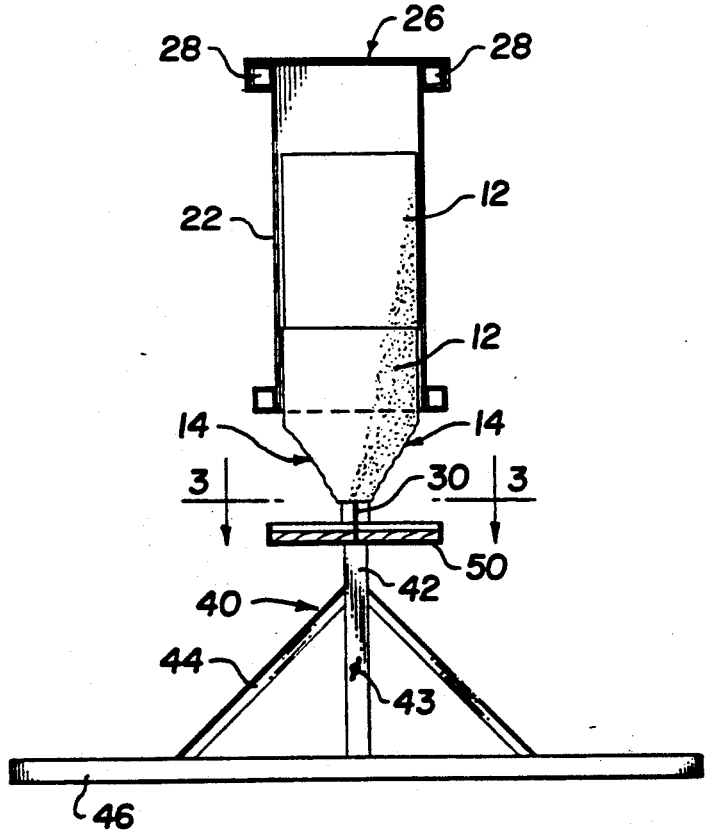
FIG. 2 is a section view taken along line 2—2 of the block feeder shown in FIG. 1.
Figure 3:
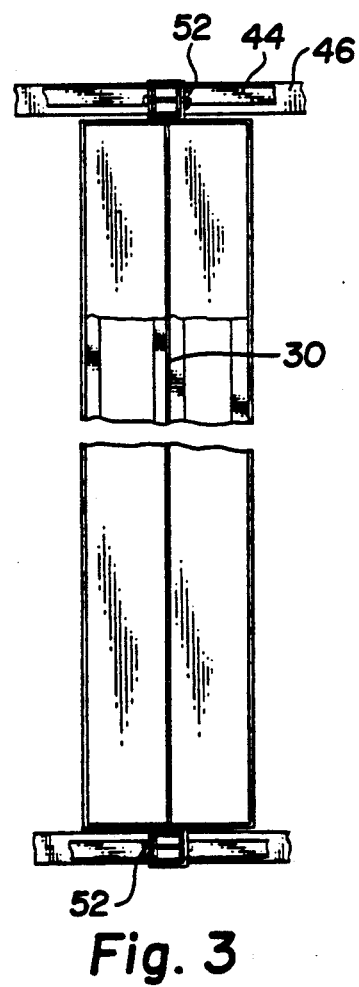
FIG. 3 is a section view taken along line 3—3 of the block feeder shown in FIG. 2.

Referring now to the FIGS. 1-3 of the drawing, the numeral 10 generally refers to a preferred embodiment of the block feeder according to the invention. The block feeder 10 includes a bin 20 having side walls 22 and 24. The feed bin 20 is shown to be sufficiently large to accommodate ten feed blocks 12 (five stacks of two feed blocks per stack). The feed bin includes a lid 26. Preferably side walls 22 and 24 have outwardly extending edges or lips 28. Lid 26 fits over the top edges of side walls 22 and 24.

The feed blocks 12 are supported by support bar 30. Support bar 30 is preferably located toward the center of the feed blocks 12. Furthermore, support bar 30 is narrow where it contacts the feed blocks 12 that a relatively small portion of the feed block is in contact with the support bar 30. For example, the support bar 30 may be a flat bar that is ¼ inch wide by 2½ inch high.

The feed bin 20 and the support bar 30 are supported by support structure 40. Support structure 40 includes vertically extending legs 42. In the preferred embodiment shown in the Figures, the height of legs 42 are adjustable by loosening wing nuts 43, extending or telescoping the legs 42, and re-tightening wing nuts 43. In the preferred embodiment shown in the Figures, the feed bin 20 is attached to the legs 42 at 41.

Legs 42 are laterally supported by struts 44 and platforms 46. Legs 42, struts 44, and platforms 46 may be formed, or example, of angle iron or square tubulars. Platforms 46 preferably extend sufficiently to support the block feeder 10 on an uneven surface or in muddy ground.

In the preferred embodiment shown in the Figures, the block feeder 10 also includes a tray 50. The tray 50 may have upwardly extending lips to help keep any fallen feed particles on the tray surface. The height of the tray 50 may be adjustable by loosening wing nuts 52, raising or lowering the tray on the vertically extending legs 42, and re-tightening the wing nuts 52. The tray and support bar may be connected together.

In a preferred embodiment of the invention, the bottom surface of the tray 50 may be formed of wooden boards or planks supported at the edges of the tray so that the feed particles are substantially retained on the tray but water may drain around the edges of the boards. The wooden boards do not rust as a metal tray would. The boards may be easily replaces if needed.

As is readily apparent from the Figures of the preferred embodiment, the animals may approach the block feeder 10 from either side along side walls 22. As the animals consume the exposed portion of the lowermost feed blocks 12, the feed blocks will be eroded toward the center vertical plane that includes the support bar 30, producing recessed surfaces 14 on the feed blocks beneath the feed bin. The recessed surfaces 14 of the feed blocks further protects the feed blocks from the weather and spoilage. Feed scraps may fall into the tray 50 so that the waste is minimized. As the animals continue to consume the feed blocks, the lowermost portion will become eroded to the extent it can no longer support the weight of the feed blocks causing the feed blocks to slide downward. Therefore, the feed blocks 12 slide downward as they are consumed, exposing more of the feed blocks to the animals.

It is to be understood that reasonable variations may be made to the foregoing disclosure without departing from the spirit and scope of the invention.

What is claimed is:

1. A block feeder for feeding compressed block feed to animals such as cattle, sheep, goats, deer, and the like, the block feeder keeping the block feed dry so that the feeder can be restocked less frequently, the block feeder comprising:
    (a) feed receptacle, said receptacle of a size and shape to at least partially accommodate at least one feed block, said receptable having side walls and top wall so that at least the upper portion of the feed block is substantially protected from precipitation;
    (b) support means for supporting the bottom of the feed block, said support means being spaced below the side walls an amount less than the height of the feed block such that said side walls retain the feed block in position on said support means and a portion of the feed block extends below said side walls of said receptacle whereby animals may reach and eat at the lower extending portion of the feed block and as the lower portion of the feed block is consumed by the animals, the feed block slides downward, exposing more of the feed block for the animals;
    (c) structure means for supporting said feed receptacle and said support means for supporting the feed block; and
    (d) a tray supported by said structure support means beneath the feed block so that dislodged feed particles from the feed block fall into the tray and may be eaten therefrom.

2. The block feeder of claim 1 wherein said top wall of said receptacle may be opened so that feed blocks may be placed in the block feeder.

3. The block feeder of claim 1 wherein said top wall of said receptacle extends beyond the side walls of said receptacle whereby said top wall provides additional protection from precipitation.

4. The block feeder of claim 1 wherein said side walls extend vertically.

5. The block feeder of claim 1 wherein said support means for supporting the feed block comprises a support bar positioned beneath said side walls of said receptacle.

6. The block feeder of claim 5 wherein the height of the support bar is adjustable.

7. The block feeder of claim 5 wherein said support bar is located to support the center portion of the bottom of a feed block so that the animals may approach the block feeder from either side of the support bar and as the animals consume the exposed lower portion of the feed block, the remaining portion of the feed block between the support bar and said side walls of said receptacle becomes recessed beneath said receptacle.

8. The block feeder of claim 1 wherein said structure means for supporting comprises a set of legs and struts.

9. The block feeder of claim 8 wherein said structure means for supporting is adjustable so that said receptacle and said support means may be raised and lowered to accommodate different animals.

10. The block feeder of claim 9 wherein said legs telescope for adjusting the height of said receptacle to accommodate different animals.

11. The block feeder of claim 9 wherein said the height of said tray is adjustable on said structure support means so that said tray may be raised and lowered to accommodate different animals.

12. The block feeder of claim 1 wherein said tray has a bottom surface having one or more small openings therein whereby dislodged feed particles are substantially retained on said tray but water may drain through said openings so that water does not accumulate in said tray.

13. The block feeder of claim 1 wherein the block feeder accommodates at least two stacked feed blocks above said support means, a portion of the lower feed block being exposed beneath said side walls of said feed receptacle whereby as the lower feed block is consumed by the animals, the stacked feed blocks slide downward to expose more of the feed blocks to be eaten and as the lower feed block slides completely beneath the side walls of said feed receptacle, the weight of the upper feed blocks retains the lower feed block in position between the support means and the upper feed blocks.

* * * * *

UNITED STATES PATENT AND TRADEMARK OFFICE
CERTIFICATE OF CORRECTION

PATENT NO. : 5,195,458
DATED : 03/23/93
INVENTOR(S) : Garland Black, Roy W. Sanders It is certified that error appears in the above-identified patent and that said Letters Patent is hereby corrected as shown below:

In Column 2, line 48, change "or" to -- for --;
In Column 4, line 30, change "9" to -- 1 --.

Signed and Sealed this

Twenty-fifth Day of January, 1994

Attest:

BRUCE LEHMAN

*Attesting Officer*     Commissioner of Patents and Trademarks